(12) United States Patent
Bahar et al.

(10) Patent No.: US 12,145,141 B2
(45) Date of Patent: Nov. 19, 2024

(54) MULTILAYERED ION EXCHANGE MEMBRANES

(71) Applicant: FFI IONIX IP, INC., Wilmington, DE (US)

(72) Inventors: Bamdad Bahar, Harrington, DE (US); John Paul Saltwick, Harrington, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 0 days.

(21) Appl. No.: 18/228,624

(22) Filed: Jul. 31, 2023

(65) Prior Publication Data

US 2023/0372924 A1 Nov. 23, 2023

Related U.S. Application Data

(63) Continuation of application No. 17/461,409, filed on Aug. 30, 2021, now Pat. No. 11,712,690, which is a
(Continued)

(51) Int. Cl.
*B01J 47/12* (2017.01)
*B01D 69/10* (2006.01)
(Continued)

(52) U.S. Cl.
CPC ............ *B01J 47/12* (2013.01); *B01D 69/106* (2022.08); *B01D 69/1218* (2022.08); *C08J 5/2225* (2013.01); *B01D 2325/42* (2013.01)

(58) Field of Classification Search
CPC ....... B01J 47/12; C08J 6/2215; B01D 69/106; B01D 69/1218; B01D 2325/42
(Continued)

(56) References Cited

U.S. PATENT DOCUMENTS 5,547,551 A * 8/1996 Bahar ................. H01M 8/1062
204/632
6,130,175 A * 10/2000 Rusch .................... C08J 5/2275
428/319.3
(Continued)

FOREIGN PATENT DOCUMENTS

WO WO-2015184568 A1 * 12/2015 ............... C08J 5/22
WO 2018231232 A1 12/2018

*Primary Examiner* — Michael M. Bernshteyn
(74) *Attorney, Agent, or Firm* — Invention To Patent Services; Alex Hobson

(57) ABSTRACT

An ion exchange membrane has multiple layers of ionic polymers which each contain substantially different chemical compositions. i.e. varying side chain lengths, varying backbone chemistries or varying ionic functionality. Utilizing completely different chemistries has utility in many applications such as fuel cells where for example, one layer can help reduce fuel crossover through the membrane. Or one layer can impart substantial hydrophobicity to the electrode formulation. Or one layer can selectively diffuse a reactant while excluding others. Also, one chemistry may allow for impartation of significant mechanical properties or chemical resistance to another more ionically conductive ionomer. The ion exchange membrane may include at least two layers with substantially different chemical properties.

13 Claims, 4 Drawing Sheets

Related U.S. Application Data continuation of application No. 16/560,876, filed on Sep. 4, 2019, now Pat. No. 11,103,864.

(60) Provisional application No. 62/765,537, filed on Sep. 4, 2018.

(51) Int. Cl.
  *B01D 69/12* (2006.01)
  *C08J 5/22* (2006.01)

(58) Field of Classification Search
  USPC .......................................................... 521/27
  See application file for complete search history.

(56) References Cited

U.S. PATENT DOCUMENTS

| | | | |
|---|---|---|---|
| 7,094,851 B2 | 8/2006 | Wu et al. | |
| 9,457,318 B2 | 10/2016 | Linder et al. | |
| 2010/0167100 A1* | 7/2010 | Moore | B01D 67/0088 |
| | | | 521/27 |
| 2013/0022894 A1* | 1/2013 | Zou | C08J 5/2281 |
| | | | 429/494 |
| 2014/0349213 A1 | 11/2014 | Pintauro et al. | |
| 2018/0043346 A1* | 2/2018 | Bahar | C08J 5/2262 |

\* cited by examiner

MULTILAYERED ION EXCHANGE MEMBRANES

CROSS REFERENCE TO RELATED APPLICATIONS

The application is a continuation of U.S. patent application Ser. No. 17/461,409, filed on Aug. 30, 2021 and issued as U.S. Pat. No. 11,712,690 on Aug. 1, 2023, which is a continuation of U.S. patent application Ser. No. 16/560,876, filed on Sep. 4, 2019 and issued as U.S. Pat. No. 11,103,864 on Aug. 31, 2021, which claims the benefit of priority to U.S. provisional patent application No. 62/765,537, filed on Sep. 4, 2018; the entirety of which is hereby incorporated by reference herein.

BACKGROUND OF THE INVENTION

The invention relates to solid polymer ion exchange membranes suitable for use in electrochemical and pervaporative applications.

BACKGROUND

Ion exchange membranes (IEM) are used in electrochemical devices as solid electrolytes. A membrane separating the cathode and anode transports ions formed at the catalyst layer of one electrode to the other electrode, enabling the device to function by either providing an electrical current (in the case of a fuel cell), producing gases (in the case of an electrolyzer), or compressing a gas (in the case of an electrochemical compressor).

For fuel cells, solid polymer electrolyte electrolyzers and electrochemical compressors to achieve full commercialization and widespread integration, they must achieve high power densities at low costs. To do so, high performance IEMs are required. High performance IEMs can be characterized by high ion conductivity, low electrical conductivity, low gas permeance (commonly referred to as crossover), high mechanical strength, and high dimensional stability.

To achieve these properties, numerous strategies have been examined. U.S. Pat. No. 5,547,551 to Bahar et al. describes a composite IEM prepared by impregnating a porous material, in this case an expanded polytetrafluoroethylene membrane with thickness less than 0.025 mm, with an ion exchange material, in this case perfluorosulfonic acid (PFSA). This form of IEM has become the preferred form of IEM for automotive fuel cell applications, enabling high ion conductance and high mechanical strength and stability at a low thickness. Typical examples of composite ion exchange membranes reinforced with porous materials are GORE-SELECT sold by W.L. Gore and Associates, Nafion® XL sold by Chemours, and Tokuyama A201 from Tokuyama Corp.

A critical issue with thin IEMs is fuel (in the case of a hydrogen fuel cell, hydrogen) crossover across the membrane during operation. Crossover results in both degradation of the membrane and reduced fuel cell performance. Crossover in an electrochemical cell is often characterized by electrochemical techniques and is described as a crossover current density.

In proton exchange membrane (PEM) fuel cells (PEMFC), reinforced composite PFSA membranes are the preferred form for leading automotive fuel cell applications. PFSA polymers are produced by several companies under several brand names, such as Nafion® from Chemours, Flemion® from Asahi Glass Co. Chemicals, Aquivion® from Solvay Specialty Polymers, and Dyneon™ from 3M. Some key differences among various PFSA polymers are their ion exchange capacities or degree of sulfonic acid functionalization, which is often expressed as equivalent weight (EW) in g/mol, and their side chain lengths, which can be expressed as the number of carbon atoms in the side chain.

PFSA equivalent weights are expressed in grams of polymer per moles of sulfonic acid functional groups. Generally, PFSA water uptake by mass, swelling by volume, and conductivity increase with decreasing equivalent weight.

PFSA side chain lengths are often described qualitatively, in that polymers are referred to as "long side chain" or "short side chain." Nafion® ion exchange polymers are referred to as "long side chain," having six carbons in their side chains with two vinyl ether groups, while Aquivion ion exchange polymers are referred to as "short side chain," having two carbons in their side chains and one vinyl ether group. Short side chain polymers exhibit higher degrees of crystallinity, lower hydrogen crossover, and lower water uptake behavior at the same EW relative to long side chain polymers.

It has been demonstrated that short side chain PFSA polymers exhibit significantly lower hydrogen crossover, as characterized by current density, than their long side chain counterparts. Additionally, short side chain PFSA polymers demonstrate greater stability of hydrogen crossover over several days at OCV conditions.

In the case of non-PFSA ion exchange polymers, especially in the case of anion exchange polymers, various cationic functional groups grafted to the same polymer backbone can exhibit various degrees of fuel crossover and conductivity. For example, an anion exchange polymer may contain a tetramethylammonium functional group to provide anion exchange capacity. However, substitution of this functional group with a pyridinium or piperidinium functional group may result in varying fuel crossover or conductivity properties.

U.S. Pat. No. 6,130,175A to Rusch et al. describes a multi-layered composite ion exchange membrane suitable for use in fuel cells or electrodialysis applications. The multi-layers described have essentially the same chemistry (i.e. backbone and functional groups) but simply different densities of functional groups from one layer to the next. The patent does not cover use of substantially different chemistries employed such as an ionomer with a different polymer side chains or for example combining cationic with anionic polymers or the use of anion exchange chemistries with different backbone chemistries described herein within any layer.

Chemours Nafion products markets a membrane product to the chlor-alkali industry made with perfluorinated sulfonic acid ionomer, with thin layer of a similar perfluorinated carboxylic acid functionalize ionomer. Substituting the sulfonic acid group with carboxylic acid, however, maintaining the chemistry of the backbone structure. Again, the ionomer chemistries are substantially the same.

Again, in this invention, the overall membrane consists of at least two layers with substantially different chemical properties, wherein at least one layer is a composite membrane.

SUMMARY OF THE INVENTION

The present invention describes an ion exchange membrane comprising multiple layers of ionic polymers which each contain substantially different chemical compositions, i.e. varying side chain lengths, varying backbone chemistries or varying ionic functionality.

Utilizing completely different chemistries has utility in many applications such as fuel cells where for example one layer can help reduce fuel crossover through the membrane. Or one layer can impart substantial hydrophobicity to the electrode formulation. Or one layer can selectively diffuse a reactant while excluding others. Also, one chemistry may allow for impartation of significant mechanical properties or chemical resistance to another more ionically conductive ionomer.

In this invention, the overall membrane composite comprises at least two layers with substantially different chemical properties.

In one aspect, the present invention provides an ion exchange membrane comprising a porous reinforcement scaffold imbibed with multiple layers of variously functionalized ionic polymers. Typically, the membrane is 50 microns or less, more typically 30 microns or less and in some embodiments 20 microns or less.

In one embodiment, a membrane is prepared by providing two distinct solutions of PFSA polymers of various equivalent weights in mixtures of water and alcohols along with a porous reinforcement material. The porous reinforcement material is coated on one side with the first solution with a doctor blade and then dried. Then, the porous reinforcement material is coated on the second side with the second solution and then dried, filling the remainder of the pores in the reinforcement material and creating a multilayer ion exchange membrane.

The ion conducting polymers including a PFSA polymers may have substantially different equivalent weights, such as at least about 20% different, or at least about 30% different, or as high as 40% different, or at least 50% different such as a 1500 versus 900 equivalent weight for example. Likewise, the ion conducting polymers may have substantially different side chain lengths such as such as at least about 20% different, or at least about 30% different, or as high as 40% different, or at least 50% different and any range between and including the percentages listed.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
FIG. 1 and FIG. 2 show common perfluorosulfonic acid (PFSA) chemical structures.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

In one embodiment, a membrane is prepared by providing two distinct solutions of PFSA polymers of various equivalent weights in mixtures of water and alcohols along with a porous reinforcement material. The porous reinforcement material is coated on one side with the first solution with a doctor blade and then dried. Then, the porous reinforcement material is coated on the second side with the second solution and then dried, filling the remainder of the pores in the reinforcement material and creating a multilayer ion exchange membrane. The ion conducting polymers including a PFSA polymers may have different equivalent weights, such as at least about 20% different, or at least about 30% different, or as high as 40% different, or at least 50% different such as a 1500 versus 900 equivalent weight for example. Likewise, the ion conducting polymers may have varying side chain lengths such as such as at least about 20% different, or at least about 30% different, or as high as 40% different, or at least 50% different and any range between and including the percentages listed.

Figure 2:

FIG. 1 and FIG. 2 show two examples of exemplary PFSA structures. FIG. 1A is a representation of a "long side chain" PFSA polymer, which contains five carbons in the side chain, while FIG. 2 is a representation of a "short side chain" PFSA polymer, containing two carbons in the side chain.

Figure 3:
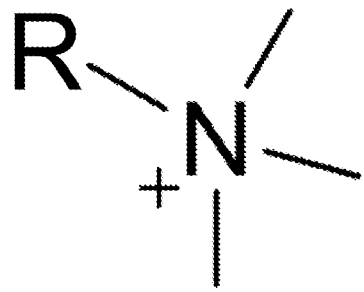
FIG. 3, FIG. 4, and FIG. 5 show several possible quaternary ammonium cationic functional groups.
Figure 4:
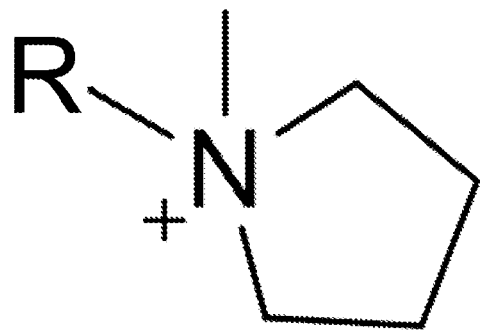
Figure 5:
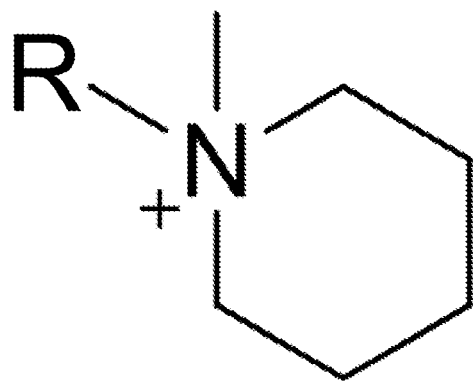

FIG. 3, FIG. 4 and FIG. 5 show three examples of exemplary quaternary ammonium functional groups. FIG. 3 is a representation of a trimethylammonium functional group, FIG. 4 is a representation of a pyrrolidinium functional group, and FIG. 5 is a representation of a piperidinium functional group. In all cases, "R" is standard organic chemistry notation and indicates any other group containing carbon or hydrogen, presumed here to indicate the polymer side chain.

Figure 6:
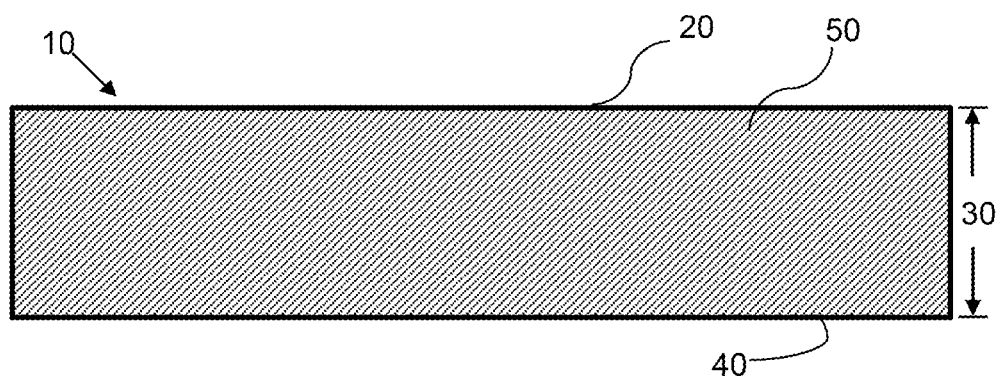
FIG. 6 shows an exemplary porous reinforcement scaffold material.

As shown in FIG. 6, an exemplary porous scaffold 10 has a thickness 30 from a first side 20 and an opposite second side 40. The porous scaffold has pores 50 and an open structure extending from the first side 20 to the second side 40, allowing for a flow of appropriate fluid from the first to the second side. The porous scaffold is air permeable when not imbibed with another solid material.

Figure 7:
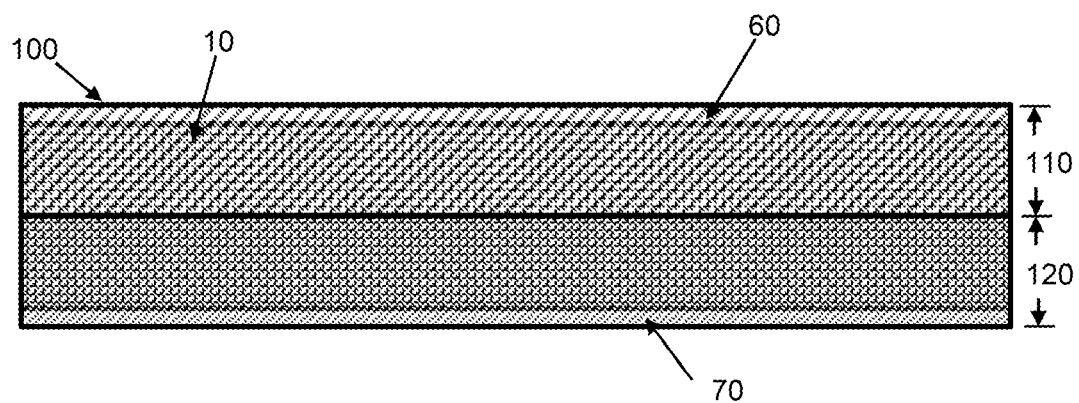
FIG. 7 shows an example of a membrane with two different equivalent weight ion exchange polymers.

As shown in FIG. 7, a multilayered membrane 100 may comprise a first layer 110 comprising an ion exchange polymer with a first equivalent weight 60 and a second layer 120 comprising an ion exchange polymer with a second equivalent weight 70, both imbibed into the porous scaffold 10.

Figure 8:
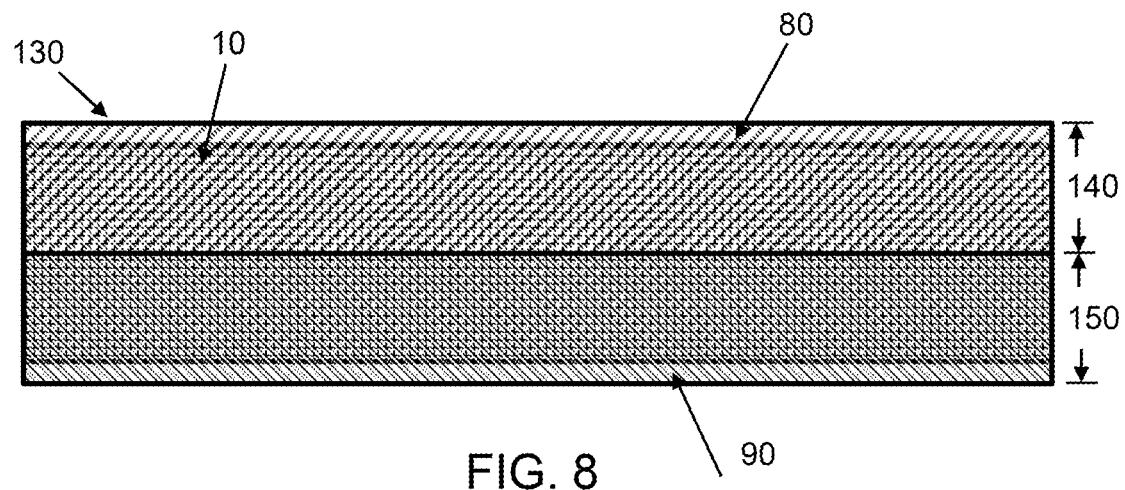
FIG. 8. shows an example of a membrane with two different side chain lengths.

As shown in FIG. 8, a multilayered membrane 130 may comprise a first layer 140 comprising an ion exchange polymer with a first side chain length 80 and a second layer 150 comprising an ion exchange polymer with a second side chain length 90, both imbibed into the porous scaffold 10.

Figure 9:
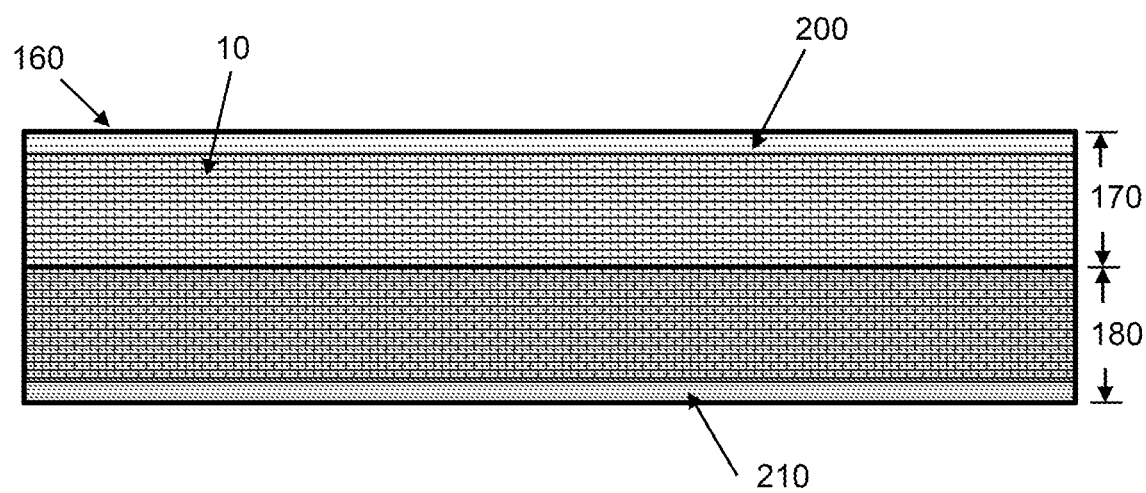
FIG. 9. shows an example of a membrane with two different functional groups.

As shown in FIG. 9, a multilayered membrane 160 may comprise a first layer 170 comprising an ion exchange polymer with a functional group 200 and a second layer 180 comprising an ion exchange polymer with a second functional group 210, both imbibed into the porous scaffold 10.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A composite ion exchange membrane comprising:
   a) a first layer of ion exchange polymer having a first ion exchange capacity, a first side chain length, and a first functional group; and
   b) a second layer of ion exchange polymer having a second ion exchange capacity that is at least 20% greater than said first ion exchange capacity.

2. The ion exchange membrane of claim 1, wherein the ion exchange polymer is a cation exchange polymer.

3. The ion exchange membrane of claim 1, wherein the ion exchange polymer is perfluorinated.

4. The ion exchange membrane of claim 1, wherein the ion exchange polymer is perfluorosulfonic acid (PFSA).

5. The ion exchange membrane of claim 4, wherein the first layer of ion exchange polymer has an equivalent weight of ion exchange polymer per moles of functional group of 800 g/mol or less.

6. The ion exchange membrane of claim 1, wherein the first functional group is a sulfonic acid functional group.

7. The ion exchange membrane of claim 6, wherein the second layer of ion exchange membrane has carboxylic acid functional groups.

8. The ion exchange membrane of claim 1, wherein the ion exchange polymer is an anion exchange polymer.

9. The ion exchange membrane of claim 1, wherein the composite ion exchange membrane further comprises a porous scaffold material and wherein at least one of the first layer of ion exchange polymer or second layer of ion exchange polymer is configured in said porous scaffold material.

10. The ion exchange membrane of claim 9, wherein the porous scaffold material is selected from the group consisting of: microporous polyethylene, microporous polypropylene, or microporous polytetrafluoroethylene.

11. The ion exchange membrane of claim 10, wherein the porous scaffold material has a pore size of 0.005 microns to 0.05 microns.

12. The ion exchange membrane of claim 1, wherein, the first layer of ion exchange polymer has a first side chain length and wherein the second layer of ion exchange polymer has a second side chain length that is at least 20% longer than said first side chain length.

13. The ion exchange membrane of claim 1, wherein the first layer of ion exchange polymer has a first functional group and wherein the second layer of ion exchange polymer has a second functional group that is different than said first functional group.

* * * * *